United States Patent Office 2,857,402
Patented Oct. 21, 1958

2,857,402

ALKANE TRIOL TRIS-3,4-EPOXYCYCLO-HEXANECARBOXYLATES

Benjamin Phillips and Paul S. Starcher, Charleston, W. Va., assignors to Union Carbide Corporation, a corporation of New York No Drawing. Application May 21, 1956
Serial No. 585,955

9 Claims. (Cl. 260—348)

This invention is directed to a new class of organic compounds which are useful in the plastics and resins industry. More particularly, this invention relates to a new class of triepoxide compounds prepared from the cycloaliphatic esters of polyhydric compounds.

The compounds of this invention are organic triol tris-(3,4 - epoxycyclohexanecarboxylate) compounds which may be conveniently characterized by the general formula:

(I)
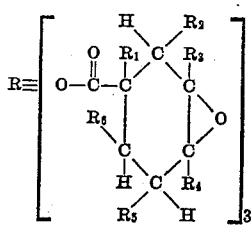

wherein, R represents a trivalent aliphatic group having up to 22 carbon atoms and $R_1$, $R_2$, $R_3$, $R_4$, $R_5$ and $R_6$ represent hydrogen and alkyl groups having from 1 to 4 carbon atoms. More specifically, the compounds which are especially useful are those wherein the total number of alkyl groups as represented by $R_1$ through $R_6$ on any one cyclohexane ring does not exceed five, and the total number of carbon atoms contained by these alkyl groups on any one cyclohexane ring does not exceed 12. The preferred compounds of this invention are alkanetriol tris - (3,4 - epoxycyclohexanecarboxylate) compounds which may be characterized by Formula I, wherein, however, R represents a trivalent alkane group having from 3 to 18 carbon atoms and no more than one valence on a single carbon atom and $R_1$, $R_2$, $R_3$, $R_4$, $R_5$ and $R_6$ represent groups as previously defined. Particularly preferred compounds include alkanetriol tris-(3,4-epoxycyclohexanecarboxylate), alkanetriol tris-(1-methyl-3,4-epoxycyclohexanecarboxylate) and alkanetriol tris-(6-methyl-3,4-epoxycyclohexanecarboxylate) compounds and may be characterized by Formula I, wherein, however, R represents a trivalent alkane group, $R_2$, $R_3$, $R_4$ and $R_5$ represent hydrogen atoms, and $R_1$ and $R_6$ represent groups from the class of hydrogen and alkyl groups having from 1 to 4 carbon atoms.

Representative trivalent aliphatic groups such as those characterized by R in Formula I include groups which may be regarded as being the residue of trihydric (alcohols) without the hydroxyl groups. Examples of such trihydric (alcohols) include aliphatic triols, such as 1,2,3-propanetriol, trimethylolmethane, 1,1,1-trimethylolethane, 1,1,1-trimethylolpropane, 1,2,6-hexanetriol, cycloaliphatic triols and aromatic triols, such as 1-allyloxy-2,4,6-trimethylolbenzene, 1-phenylpropane-1,2,3-triol, 1,4-benzopyran-3,5,7-triol, and the like.

The compounds of this invention can be prepared by the oxidizing action of an epoxidizing agent, such as, peracetic acid, acetaldehyde monoperacetate, and the like, on an aliphatic triol tris-(3-cyclohexenecarboxylate) starting material which may be characterized by the general formula:

(II)
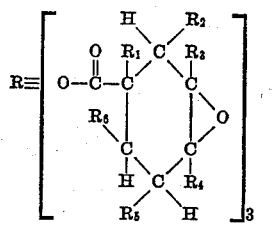

wherein R, $R_1$, $R_2$, $R_3$, $R_4$, $R_5$ and $R_6$ are as previously defined.

The treatment of an aliphatic tris-(3-cyclohexenecarboxylate) starting material, as represented by Formula II, with an epoxidizing agent can be carried out to epoxidize the double bonds of the starting material. The treatment of an ethylenically unsaturated starting material with peracetic acid and the ensuing reaction may be characterized by the general equation:

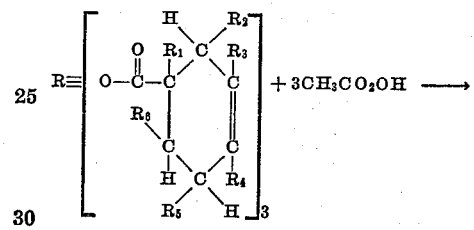

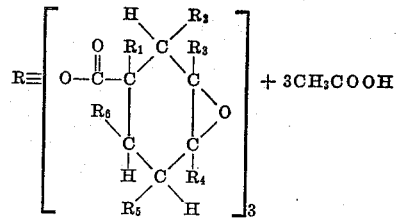

wherein, R, $R_1$, $R_2$, $R_3$, $R_4$, $R_5$ and $R_6$ are as previously defined. The reaction of an ethylenically unsaturated compound with acetaldehyde monoperacetate proceeds in a similar manner. However, in addition to acetic acid being formed in the reaction there is also formed acetaldehyde, as a by-product.

The reaction as characterized in the foregoing equation can be carried out by charging an organic triol tris-(3-cyclohexenecarboxylate) starting material to a reaction vessel and then gradually adding the epoxidizing agent. The epoxidizing agent is preferably employed as a solution in a suitable solvent, as for example, acetone, acetal, methyl ethyl ketone, butyl acetate, and the like, in order to provide ease of handling and to remove the explosion hazard which attends the handling of highly concentrated or crystalline peracetic acid.

The epoxidation reaction can be carried out at a temperature within the range of —25° C. to 150° C. Longer reaction times are preferred at the lower temperatures of this range to produce high yields. At the higher temperatures of this range, side reactions form undesirable materials which can be removed by purification procedures. Reaction temperatures in the range of 10° C. to 90° C. are preferred. The reaction conditions can be maintained until an analysis for epoxidizing agent indicates that substantially all of the epoxidizing agent charged to the reaction vessel has been consumed.

The molar ratio of epoxidizing agent to organic triol tris-(3-cyclohexenecarboxylate) starting material may be varied over a wide range. As shown by the foregoing equation a ratio of three mols of epoxidizing agent to one mol of starting material theoretically may be used. Molar excesses of one or the other reactant over the theoretical amount may be used without seriously affecting the reaction or its efficiency.

When desired or after completion of the reaction, the solvent employed, and unreacted peracetic acid and acetic acid and acetaldehyde if any, formed during the reaction can be removed from the reaction mixture. This can be expeditiously accomplished by feeding the reaction mixture into a still kettle containing a potboiler, such as ethylbenzene, which is refluxing under reduced pressure, and stripping the low-boiling components. The epoxidized product can be recovered as residue and refined, as by distillation.

Organic triol tris-(3-cyclohexenecarboxylate) starting materials can be prepared, in accordance with known procedures, by condensing a 3-cyclohexenecarboxylic acid with an organic triol. For example, a 3-cyclohexenecarboxylic acid and an organic triol are mixed in a mol ratio of about three mols of acid per mol of triol and the mixture heated to a temperature in the range of 100° C. to 200° C. in an azeotrope-forming solvent, such as toluene, benzene and the like. Water formed by the reaction is continuously removed by reflux and the polyester product recovered as residue.

The various organic triols which may be used to prepare organic triol tris-(3-cyclohexenecarboxylate) starting materials include aliphatic triols, such as 1,2,3-propanetriol, trimethylolmethane, 1,1,1-trimethylolethane, 1,1,1-trimethylolpropane, 1,2,6-hexanetriol, cycloaliphatic triols and aromatic triols, such as 1-allyloxy-2,4,6-trimethylolbenzene, 1-phenylpropane-1,2,3-triol, 1,4-benzopyran-3,5,7-triol, and the like.

Unsaturated cyclo-aliphatic carboxylic acids and, in particular, 3-cyclohexenecarboxylic acids, used in preparing aliphatic triol tris-(3-cyclohexenecarboxylate) compounds can be obtained by oxidation, according to known procedures, of 3-cyclohexenecarboxaldehydes. These 3-cyclohexenecarboxaldehydes may be prepared by a Diels-Alder type reaction of butadiene or homologs of butadiene with alpha, beta unsaturated aliphatic aldehydes, such as, for example, acrolein, methacrolein, crotonaldehyde and the like. Examples of combinations of reactants which may be employed in preparing 3-cyclohexenecarboxaldehydes for subsequent oxidation to 3-cyclohexenecarboxylic acids include, acrolein and butadiene, crotonaldehyde and butadiene, methacrolein and butadiene, acrolein and isoprene, crotonaldehyde and isoprene, methacrolein and isoprene, acrolein and 1,3-pentadiene, crotonaldehyde and pentadiene, methacrolein and pentadiene, acrolein and 2,3-dimethylbutadiene, crotonaldehyde and 2,3-dimethylbutadiene, methacrolein and 2,3-dimethylbutadiene, and the like. Thus, the cyclohexenyl ring of the aliphatic triol tris-(3-cyclohexenecarboxylate) compounds may have a variety of alkyl substituents depending on the choice of starting materials.

The compounds of this invention are particularly useful as monomeric components of polymerizable compositions. For example, these compounds may be hardened by the addition of about 0.4 weight percent of sulfuric acid and heat to form hard, tough, transparent polymers. Compositions containing the compounds of this invention can be employed in molding compositions, as surface coatings, as adhesives, and the like.

The following examples are presented. In these examples, the analyses for epoxy group content are based upon the reaction of epoxy groups with pyridine hydrochloride to form the chlorhydrin and pyridine. An analysis of this type may be performed by introducing into a pressure bottle, containing 25 milliliters of 1 N pyridine hydrochloride in chloroform, an amount of epoxide sample calculated to consume about 50 percent of the pyridine hydrochloride. The bottle is then sealed and the contents heated in a steam bath for a period of one hour. At the end of this time, the bottle and contents are cooled, 10 drops of phenolphthalein indicator (1.0 gram per 100 milliliters of 60 percent ethanol) added, and the mixtures titrated to a permanent red end point with standard 0.2 N alcoholic potassium hydroxide solution. A blank is also run in precisely the same fashion without, however, the inclusion of a sample. The amount of pyridine hydrochloride consumed can be determined and from this determination the amount of epoxide in the sample can be calculated.

The analyses in the examples for determining epoxidizing agent content, i. e., analyses for peracetic acid or acetaldehyde monoperacetate content, may be performed by introducing a 1.0 to 1.5 gram sample of unknown epoxidizing agent content into a flask containing a mixture of 60 milliliters of aqueous (50 weight percent) sulfuric acid and 5 milliliters of a saturated potassium iodide solution. The flask then is swirled to mix the solutions and then titrated immediately with a 0.1 N aqueous sodium thiosulfate solution to a colorless end point.

In order to determine the acetic acid content, another sample of approximately the same size is taken at the same time. This sample is introduced into a flask containing 100 milliliters of water and 15 milliliters of acetaldehyde. The flask and contents are allowed to stand for 10 to 15 minutes after mixing so as to permit whatever peracetic acid and/or acetaldehyde monoperacetate present in the sample to be converted into acetic acid. The acetic acid of the solution is then titrated with a 0.5 N sodium hydroxide solution using a phenolphthalein indicator. The amount of acetic acid in the original sample is then taken to be equal to the total acetic acid as determined by titration with sodium hydroxide, minus the amount of acetic acid coming from the reaction of peracetic acid and acetaldehyde, or from the decomposition of acetaldehyde monoperacetate, present in the original sample. The amount of acetic acid formed from reaction of peracetic acid with acetaldehyde, or from decomposition of acetaldehyde monoperacetate, may be calculated from the sodium thiosulfate titration data of the preceding epoxidizing agent analysis on the basis of two moles of acetic acid being formed from each mole of epoxidizing agent.

EXAMPLE 1

*Preparation of 1,1,1-trimethylol-propane tris-(3,4-epoxycyclohexanecarboxylate)*

Six hundred and forty-one grams (1.4 mols) of 1,1,1-trimethylol-propane tris-(3-cyclohexenecarboxylate) were added to a five-liter flask fitted with a stirrer, thermometer and dropping funnel. The flask and contents were heated to a temperature of 30° C. to 35° C. with stirring. Over a period of four hours, 1980 grams of a 24.2 weight percent solution of peracetic acid in acetone (479 grams or 6.3 mols of peracetic acid) were added dropwise to the flask. During this dropwise addition, the flask was immersed in a water bath to maintain the reaction temperature at about 30° C. to 35° C. After all the peracetic acid solution had been added, the reaction was allowed to continue for an additional three hours. The reaction mixture then was stored for 16 hours at about −11° C. and after this time was added dropwise to 2500 grams of ethylbenzene refluxing at 25 millimeters of mercury absolute pressure. During the addition, acetone, acetic acid, peracetic acid and ethylbenzene were distilled off and after the addition was completed, all low-boiling materials were stripped off at a kettle temperature of not greater than 70° C. There was obtained 718 grams of a residue product which was analyzed as containing 93.6 weight percent of 1,1,1-trimethylolpropane tris-(3,4-epoxycyclohexanecarboxylate) by determination of epoxide group, 4.86 weight percent of 1,1,1-trimethylolpropane tris-(3-cyclohexenecarboxylate) by determination of double bonds, and 0.7 weight percent of acidic impurities, calculated as acetic acid. The yield of 1,1,1-trimethylolpropane tris-(3,4-epoxycyclohexanecarboxylate) was calculated at 95 percent.

In a similar manner 1,2,6-hexanetriol tris-(1-ethyl-3,4- epoxycyclohexanecarboxylate) can be prepared from 1,2,6-hexanetriol tris-(1-ethyl-3-cyclohexenecarboxylate) and 1,2,6-hexanetriol tris-(6-methyl-3,4-epoxycyclohexanecarboxylate) can be prepared from 1,2,6-hexanetriol tris-(6-methyl-3-cyclohexenecarboxylate).

EXAMPLE 2

*Preparation of 1,2,3-propane-triol tris-(3,4-epoxycyclohexanecarboxylate)*

Seven hundred and thirty-seven grams (1.77 mols) of 1,2,3-propanetriol tris-(3-cyclohexenecarboxylate) were placed in a five-liter, four-neck flask fitted with a dropping funnel, reflux condenser, stirrer and thermometer. The flask and contents were heated to a temperature between 30° C. and 35° C. with stirring. Over a period of five hours, 2480 grams of a 24.2 weight percent solution of peracetic acid in acetone (said solution containing 605 grams of peracetic acid) were added dropwise to the flask. During the dropwise addition of peracetic acid solution, the flask was maintained at a temperature between 30° C. and 35° C. by immersion in a water bath. After all of the peracetic acid solution had been added, the reaction was allowed to continue for an additional 1.5 hours. The reaction mixture was stored in a cold bath at an approximate temperature of −11° C. overnight. Then, the reaction mixture was added dropwise to about 2060 grams of ethylbenzene which was refluxing at 25 millimeters of mercury absolute pressure. During the addition, acetone, acetic acid, peracetic acid and ethylbenzene were distilled off, and after completion of the addition, all low-boiling materials were stripped off at a kettle temperature below 70° C. There were obtained 866 grams of a residue product which was analyzed as containing 63.8 weight percent of 1,2,3-propanetriol tris-(3,4-epoxycyclohexanecarboxylate of epoxide determination, 9.65 weight percent of 1,2,3-propanetriol tris-(3-cyclohexenecarboxylate) by determination of double bonds and 0.22 weight percent of acidic impurities which were determined as acetic acid. The yield of 1,2,3-propanetriol tris-(3,4-epoxycyclohexanecarboxylate) was calculated at 67.4 percent.

EXAMPLE 3

*Compositions of 1,1,1-trimethylol propane tris-(3,4-epoxycyclohexanecarboxylate) and sulfuric acid catalyst*

A mixture was prepared from 5 grams of 1,1,1-trimethylol propane tris-(3,4-epoxycyclohexanecarboxylate) and 4 drops of a 25 weight percent solution of sulfuric acid in water. This mixture contained 0.4 weight percent of sulfuric acid based on the total weight of mixture. The mixture was allowed to stand overnight for a period of about 16 hours. After this time, the mixture was heated to 120° C. and held there for a period of 35 minutes, during which time a gel was formed. This gel was maintained at a temperature of 160° C. for a period of 1.5 hours. An opaque product having a Barcol hardness of 34 was obtained.

What is claimed is:

1. A compound characterized by the general formula:

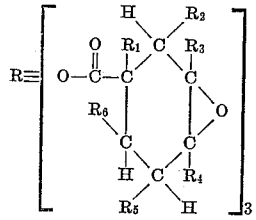

wherein, R represents a trivalent saturated aliphatic hydrocarbon group having from 3 to 18 carbon atoms and no more than one valence on a single carbon atom and $R_1$, $R_2$, $R_3$, $R_4$, $R_5$ and $R_6$ represent groups selected from the class of hydrogen and alkyl groups having 1 to 4 carbon atoms.

2. 1,1,1-trimethylolpropane tris-(3,4-epoxycyclohexanecarboxylate) having not more than 6 alkyl substituents of 1 to 4 carbon atoms on each cyclohexane ring thereof.

3. 1,1,1-trimethylolpropane tris-(3,4-epoxycyclohexanecarboxylate).

4. 1,1,1-trimethylolpropane tris - (1-methyl-3,4-epoxycyclohexanecarboxylate).

5. 1,1,1-trimethylolpropane tris - (6-methyl-3,4-epoxycyclohexanecarboxylate).

6. 1,2,3 - propanetriol tris - (3,4 - epoxycyclohexanecarboxylate) having not more than 6 alkyl substituents of 1 to 4 carbon atoms on each cyclohexane ring thereof.

7. 1,2,3 - propanetriol tris - (3,4 - epoxycyclohexanecarboxylate).

8. 1,2,3-propanetriol tris - (1-methyl-3,4-epoxycyclohexanecarboxylate).

9. 1,2,3-propanetriol tris-(6-methyl-3,4-epoxycyclohexanecarboxylate).

References Cited in the file of this patent
UNITED STATES PATENTS 2,745,847  Phillips et al. _____ May 15, 1956
2,794,812  Phillips et al. _____ June 4, 1957

UNITED STATES PATENT OFFICE
Certificate of Correction

Patent No. 2,857,402                          October 21, 1958

Benjamin Phillips et al.

It is hereby certified that error appears in the printed specification of the above numbered patent requiring correction and that the said Letters Patent should read as corrected below.

Column 2, lines 3 to 11, formula II should appear as shown below instead of as in the patent—

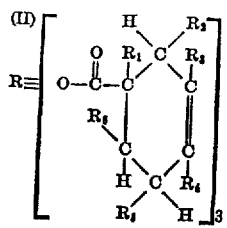

Signed and sealed this 10th day of November 1959.

[SEAL]

Attest:
KARL H. AXLINE,
*Attesting Officer.*

ROBERT C. WATSON,
*Commissioner of Patents.*